Dec. 2, 1924.

W. FRASER

AUTOMATIC HOSE PIPE CONNECTION 1,517,553

Filed Jan. 21, 1922

Inventor
William Fraser,
By [signature]
Atty.

Patented Dec. 2, 1924.

1,517,553

UNITED STATES PATENT OFFICE.

WILLIAM FRASER, OF LONDON, ENGLAND, ASSIGNOR OF TWENTY-FIVE PER CENT TO VICTOR RAMSDEN AND TWENTY-FIVE PER CENT TO ROBERT DAVID ROGERS, BOTH OF LONDON, ENGLAND.

AUTOMATIC HOSE-PIPE CONNECTION.

Application filed January 21, 1922. Serial No. 530,861.

*To all whom it may concern:*

Be it known that I, WILLIAM FRASER, a subject of the King of Great Britain, residing at 4 Maitland Park Road, Haverstock Hill, Hampstead, London, England, have invented certain new and useful Improvements in Automatic Hose-Pipe Connections, of which the following is a specification.

This invention relates to improvements in hose-pipe connections of the type comprising a metal tubular portion having a taper or bulbous end, over which the flexible hose-pipe is forced and a loose ring or sleeve mounted on the tubular portion and adapted to be pushed on to the hose-pipe so as to engage a portion of the latter surrounding the taper, bulbous or enlarged portion of the tubular portion.

The object of the invention is to provide at a low cost a connection or coupling for uniting lengths of hose-pipe, or to connect a hose-pipe to a cock or tap and without the use of male and female screw threaded parts such as are used in ordinary hose couplings, to produce or ensure the automatic gripping of the sleeve to lock it in the operative position on the hose-pipe in the neighbourhood of the enlarged part of the tubular portion and to obviate the use of washers or other devices for providing a liquid-tight joint where a length of hose is united to another piece of hose or to a cock as the case may be. Moreover, couplings constructed according to this invention may be produced by stamping and spinning and require no machining.

According to this invention, the hose-coupling or connection, comprising a tubular portion, of such a diameter as to pass into the bore of the hose and provided with a bulb or enlargement at or near one end or at both ends, is furnished with a taper sleeve adapted, at its larger end to pass over and engage the portion of the hose surrounding the bulb and such sleeve is provided at the larger end with a turned over flange, a coiled spring at one end engaging the said flange and at the other end coming against a suitable abutment, being adapted to cause the said sleeve to automatically lock the hose around the bulb. The object of using a spring or springs is to prevent the coupling from becoming disconnected accidentally or when the pressure of liquid in the hose suddenly rises. The smaller end of the taper sleeve is preferably turned inwards so as to fit loosely on the tubular portion to maintain the sleeve concentric with the tubular portion.

And in order that the invention may be readily understood, reference will be made to the accompanying drawings, in which:—

Figure 5:
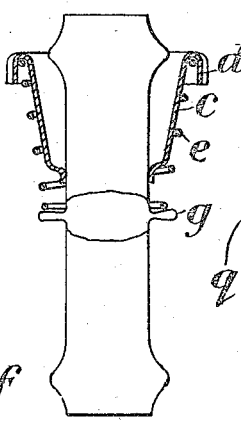
Figure 5 is a diagram of a modification.
Figure 2:
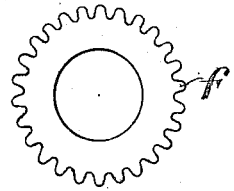
Figure 2 is a plan of a half finished part of same.
Figure 4:
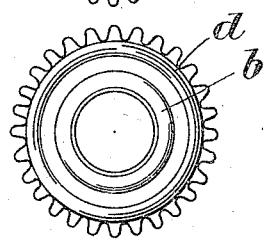
Figure 4 is a plan of a taper sleeve.

In carrying out the said invention for coupling two hose-pipes together and as shown in Figures 1, 2, 3 and 4 the tubular or body part $a$ of the coupling is constructed or provided with two bulbous or expanded ends $b$ with a parallel or cylindrical part between them for two loose taper sliding sleeves $c$ $c$ to slide backwards or forwards and provided with a taper which may correspond more or less to that on the bulbous ends of the tube, that is to say, each bulb may be more or less in the form of a truncated cone or of two such cones with their bases superposed or part spherical as shown. The outside ends of the sliding sleeves $c$ are turned or rolled over at $d$ towards the centre of the coupling. The outside flange forming this recess may be truly circular or it may be crimped or corrugated. The annular flange is for the purpose of obtaining a grip by the hand and for forming a circular recess for the reception of the terminal coil at the larger end of a spiral spring $e$. The small end is turned inwardly at $c'$ and of such an internal diameter as to fit loosely on the tubular portion $a$, but preferably it is also formed partly cylindrical at $c^2$ as shown. There is a spiral spring $e$ for each of the sliding sleeves $c$, these springs are placed upon the central cylindrical part $a$ of the coupling, and the outer coil of each spring engages its sliding sleeve, at each end of the coupling. The inside end of each spring is held in position by a central double cupped washer $f$ adapted to slide backwards and forwards upon the cylindrical or parallel part $a$ of the coupling according to the expansion or the compression in adjustment. The said springs $e$ are conveniently made conical in shape for the purpose of increasing the play or space between the two sliding sleeves as they are compressed inwards when the coupling or uncoupling of a hose-pipe is being effected. If desired, the washer $f$ is made serrated or of undulating shape at its outer periphery as shown in Figure 2 and adjacent teeth are alternately bent at right angles to the plane of the washer in opposite directions to form skeleton flanges or two separate cupped washers may be employed. The external flanges $d$ of the sleeves $c$ are corrugated, crimped or fluted or otherwise indented externally for the purpose of giving the operator, when uncoupling a hose-pipe, a sufficient hold or grip of the sleeve to force or twist it backwards without injury or the likelihood of cutting his hand, which with a plain sleeve might occur. Either sleeve $c$ may be forced back and the spring $e$ compressed at will. The hose-pipe $h$ is then pushed or slipped over the bulbous end $b$ of the coupling until it nearly approaches or reaches the cylindrical parallel part $a$ of same. The sliding sleeve $c$ is then released and the spring $e$ will automatically force the sliding sleeve forward over the bulbous end $b$ of the coupling, and the hose-pipe is thereby instantly clipped between the inner wall of the sliding sleeve $c$ and the bulb $b$. The same operation as described applies to the other end of the coupling, and with the same result. A double connection can thereby be instantaneously effected without any other operation. By preference, the bulbous ends $b$ of the said coupling are spun, one end being spun first, then one sliding sleeve $c$, a conical or spiral spring $e$ the central double cupped washer $f$ the other spring $e$ and, finally, the other sliding sleeve $c$ are slipped over the cylindrical portion of the tube, and all the parts $c$, $e$, $f$, $e$ and $c$ are then compressed together towards the spun end or bulbous part $b$ already made on the tube and held in position until the other end or bulbous part of the coupling is spun or formed, then all the various parts already mentioned are thereby kept together and cannot therefore be lost in any circumstances whatever. Or as shown in Figure 5 the washer $f$ is dispensed with and the tubular part $a$ is provided with an annular flange $g$, conveniently spun up and against which the springs $e$ abut at their smaller ends. Or, if desired, the washer $f$ may be dispensed with and instead of two springs, one like that marked $m$ in Figure 6 may be employed and in that case each terminal coil of the spring engages in the annular recess in the larger end of a sleeve $c$.

Figure 1:
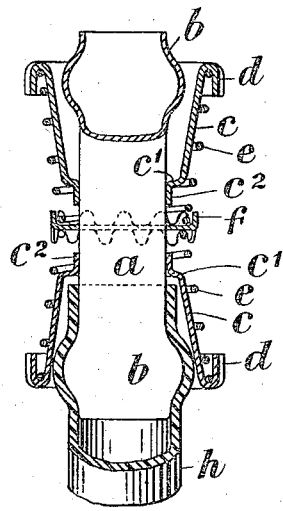
Figure 1 is a sectional elevation of a hose-coupling or connection, constructed according to this invention.
Figure 6:
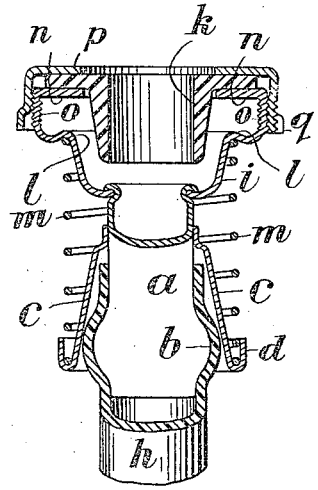
Figure 6 is a sectional elevation showing the application of the invention to a tap-union and Figure 7 is a plan of the same partly in section.
Figure 3:
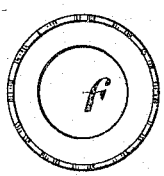
Figure 3 is a plan of the finished detail.
Figure 7:
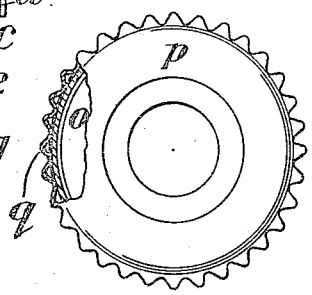

The coupling suitable and adaptable for a bib-tap is provided, as shown in Figures 6 and 7, with a tubular portion $a$, a bulbous end $b$, sliding sleeve $c$ and spring $m$, similar to the two springs $e$ combined of the double-ended connection or hose-pipe coupling already described. The tap-union end consists as usual of two separate metal parts, the socket or bottom part $i$ of which is adapted to receive the india rubber thimble $k$ and the bib of the cock or tap for the purpose of making a water tight joint with same. The socket $i$ is attached to the upper end of the tube $a$ and also serves the purpose of receiving and keeping in position the end of the spring. This socket $i$ is made of any suitable sheet metal and drawn or formed cup-shaped with a projecting circular bead or ledge $l$ producing a sunk recess projecting inwards or upwards towards the bib-cock or tap to receive and form an abutment for the spring $m$. The lower or bottom end of the socket or cup $i$ is gradually contracted to suit the depth of the rubber washer, and is of such a depth as to allow a margin of space for the projection of the nose or bib of the bib-tap below the bottom of the rubber thimble or washer $k$. The bottom part of the socket or cup is pierced or perforated to receive the upper end of the tube $a$ and to connect the parts together, the sliding sleeve $c$ and the spring $e$ are slipped over the upper end of the tube, which is then inserted through the aperture in the bottom end of the socket $i$ and rolled over from the inside of same, which thereby secures the various parts together and prevents them from being lost in any circumstances whatever. The upper part of the said socket, is made parallel and of sufficient depth or length to be rolled or turned over inwards, for the purpose of forming a suitable annular flange, ledge or support $n$ for the rubber washer $k$ to rest on. The cylindrical part $o$ of the socket $i$ is made sufficiently deep to engage a centrally perforated sheet metal cap or cover $p$ the cylindrical part of which is of sufficient depth to suit the corresponding part of the cap $p$. Both the cap or cover $p$ and the socket or cup $i$ are provided with a forced-up or cut screw-thread to engage mutually with each other. The central aperture in the upper part or top of the said cap $p$ allows of the insertion of the nose or bib of the tap or cock, and the depending internally screw threaded annular flange or barrel $o$ may be corrugated or made similar to the flange $d$ on the sliding sleeve at the bottom of the coupling at $q$ to give the grip required for the screwing up of the rubber washer or the replacing of same when required, the said cover being made of sufficient strength and thickness of metal to allow for the forcing up of the corrugations and the screwing of same. The corrugations may be half-way up as shown or the corrugations may extend all the way from the bottom to the top. The process of production may, however, vary in detail from what has been described without in any way departing from the invention.

I claim:—

1. A hose-coupling comprising in combination, a tubular portion adapted to pass into the bore of the hose, a bulb or enlargement at an end of said tubular portion, a taper sleeve adapted, at its larger end, to pass over and engage the portion of the hose surrounding the bulb, a flange at the larger end of said sleeve, and a taper or volute coiled spring, engaging an abutment at its smaller end and seated at its larger end against the said flange.

2. In a hose-coupling, the combination with a tubular portion having a diameter, externally, as adapts it to pass into the bore of the hose, and an enlargement on the said tubular portion in the neighborhood of one end thereof, of a taper sleeve, adapted, at its larger end, to pass over and engage a portion of the hose surrounding the said enlargement and furnished with a turned over edge to form an annular groove, an abutment, surrounding the tubular portion and remote from the enlargement thereon and a coiled spring situated at one end in the said annular groove and resting at its other end against the said abutment.

3. In a hose-coupling, the combination with a tubular portion having a diameter, externally, as adapts it to pass into the bore of the hose, and an enlargement on the said tubular portion in the neighborhood of one end thereof, of a taper sleeve, adapted, at its larger end, to pass over and engage a portion of the hose surrounding the said enlargement and furnished with a turned-over edge to form externally a corrugated flange and internally a substantially annular groove, an abutment, surrounding the tubular portion and remote from the enlargement thereon and a coiled spring, seated at one end in the said annular groove and resting at its other end against the said abutment.

4. In a hose-coupling, the combination with a tubular portion having a diameter, externally, as adapts it to pass into the bore of the hose, and an enlargement on the said tubular portion in the neighborhood of one end thereof, of a taper sleeve, adapted, at its larger end, to pass over and engage a portion of the hose surrounding the said enlargement and furnished with a turned over edge to form an annular groove, a flanged abutment surrounding the said tubular portion, remote from the enlargement thereon and a coiled spring situated at one end in the said annular groove and at the other end within the flange of the abutment.

5. A double ended hose coupling comprising a tube adapted to pass into the bore of the hose and having a bulb or enlargement near each end thereof, a pair of tapered sleeves mounted on the tube between said enlargements, the larger ends of said sleeves adapted to pass over and engage the portion of the hose surrounding the enlargements, the smaller ends of the sleeves constituting bearings slidable on the tube, and elastic means adapted to move the sleeves in opposite directions to force said larger ends towards the enlargements of the tube.

6. A double-ended hose-coupling comprising, in combination, a tubular portion having a diameter, externally, as adapts it to pass into the bore of the hose and an enlargement on the said tubular portion in the neighborhood of each end thereof, a pair of taper sleeves, intermediate of the said enlargements, each sleeve, adapted at its larger end to pass over and engage a portion of the hose surrounding the said enlargement, each sleeve being also provided at its larger end with a turned-over corrugated flange to form externally a gripping surface and internally a substantially annular groove, each having at its smaller end an in-turned and substantially cylindrical portion to form a guide on the tubular portion, a flanged washer, loose on the tubular portion between the enlargements thereon and two coiled springs, the end coil of each spring being seated in the annular groove of a taper sleeve and the other end coil resting against the flanged washer and within a flange thereon.

WILLIAM FRASER.